United States Patent
Ackermann

(10) Patent No.: US 12,332,145 B2
(45) Date of Patent: Jun. 17, 2025

(54) APPARATUS FOR MONITORING A POWER CAPACITOR AND ADAPTER FOR SUCH AN APPARATUS

(71) Applicant: Siemens Mobility GmbH, Munich (DE)

(72) Inventor: Markus Ackermann, Forchheim (DE)

(73) Assignee: Siemens Mobility GmbH, Munich (DE)

(*) Notice: Subject to any disclaimer, the term of this patent is extended or adjusted under 35 U.S.C. 154(b) by 429 days.

(21) Appl. No.: 17/940,204

(22) Filed: Sep. 8, 2022

(65) Prior Publication Data

US 2023/0074133 A1    Mar. 9, 2023

(30) Foreign Application Priority Data

Sep. 8, 2021 (DE) .................... 10 2021 209 893.2

(51) Int. Cl.
*H02H 7/00* (2006.01)
*G01L 19/00* (2006.01)
*G01M 3/32* (2006.01)

(52) U.S. Cl.
CPC ......... *G01M 3/3236* (2013.01); *G01L 19/003* (2013.01)

(58) Field of Classification Search
None
See application file for complete search history.

(56) References Cited

U.S. PATENT DOCUMENTS

| | | | |
|---|---|---|---|
| 5,327,784 A | 7/1994 | Venkatesan et al. | |
| 8,973,425 B2* | 3/2015 | Dzikowicz | G01M 3/40 73/49.3 |
| 10,067,194 B2* | 9/2018 | Henrici | H01M 10/48 |
| 10,684,189 B2* | 6/2020 | Kang | A45D 40/22 |
| 2019/0033164 A1* | 1/2019 | Ing | G01M 3/3236 |
| 2019/0273374 A1 | 9/2019 | Burnett et al. | |
| 2021/0025771 A1 | 1/2021 | Park et al. | |

FOREIGN PATENT DOCUMENTS

| | | |
|---|---|---|
| CN | 201163229 Y | 12/2008 |
| CN | 206378241 U | 8/2017 |
| CN | 208968737 U | 6/2019 |
| DE | 69313856 T2 | 2/1998 |
| JP | 2001237152 A | 8/2001 |
| KR | 20130076389 A | 7/2013 |
| WO | 2017028992 A1 | 2/2017 |

* cited by examiner

*Primary Examiner* — Stephen W Jackson
(74) *Attorney, Agent, or Firm* — Laurence A. Greenberg; Werner H. Stemer; Ralph E. Locher

(57) ABSTRACT

An apparatus for monitoring a power capacitor having a housing with a housing interior to be gas-tightly closed off at a housing opening, includes a sensor device outputting a signal as a function of a gas pressure in the housing. An adapter mechanically connects the sensor device to the housing at the housing opening and fluidically connects it to the housing interior. The adapter has a cylindrical adapter body divided into a plurality of functional longitudinal sections and a feed-through for the fluidic connection extending over the plurality of longitudinal sections. A first longitudinal section, disposed in a region of the housing opening after connecting the adapter to the housing, caps or closes off the feed-through in a plane perpendicular to a longitudinal axis of the adapter body and fluidically connects it to the housing interior in at least one plane parallel to the longitudinal axis.

16 Claims, 3 Drawing Sheets

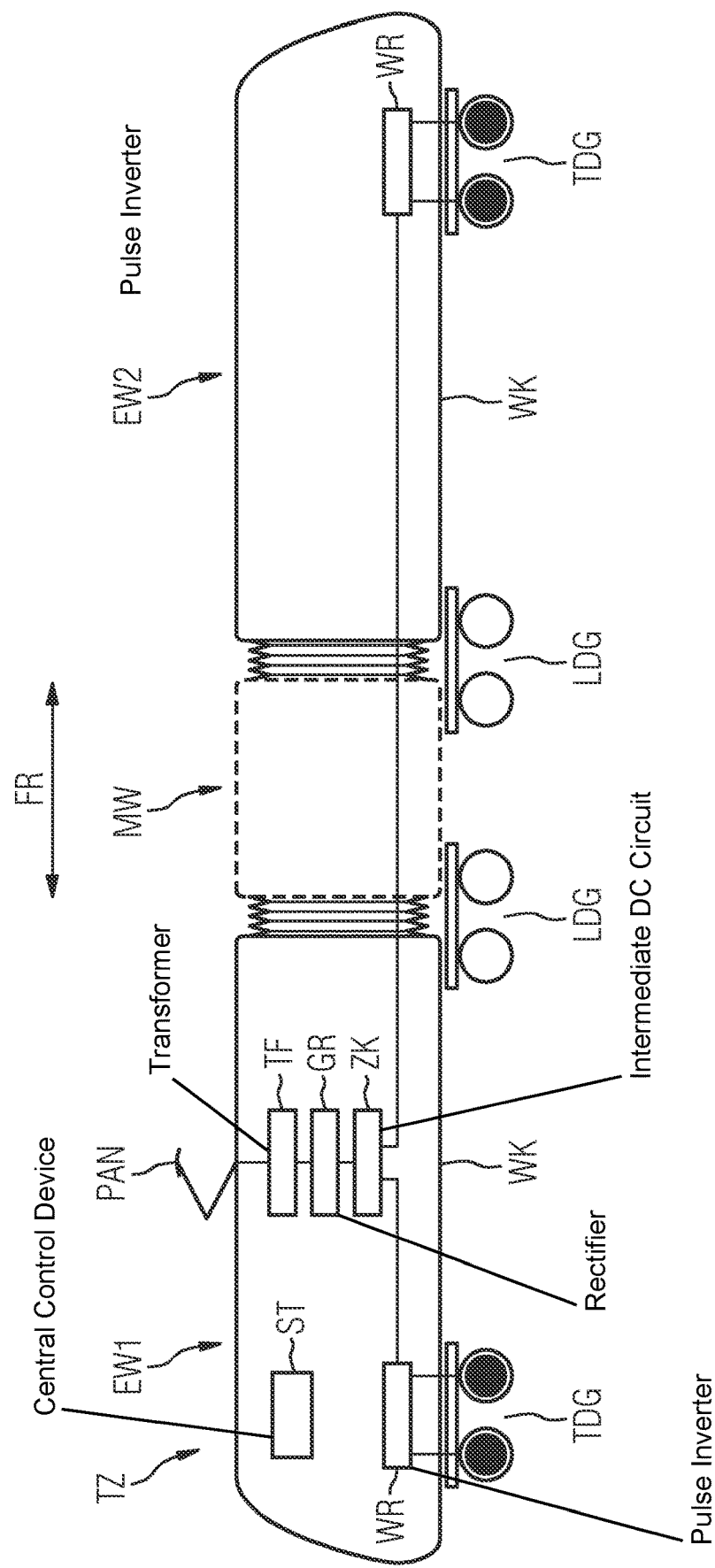

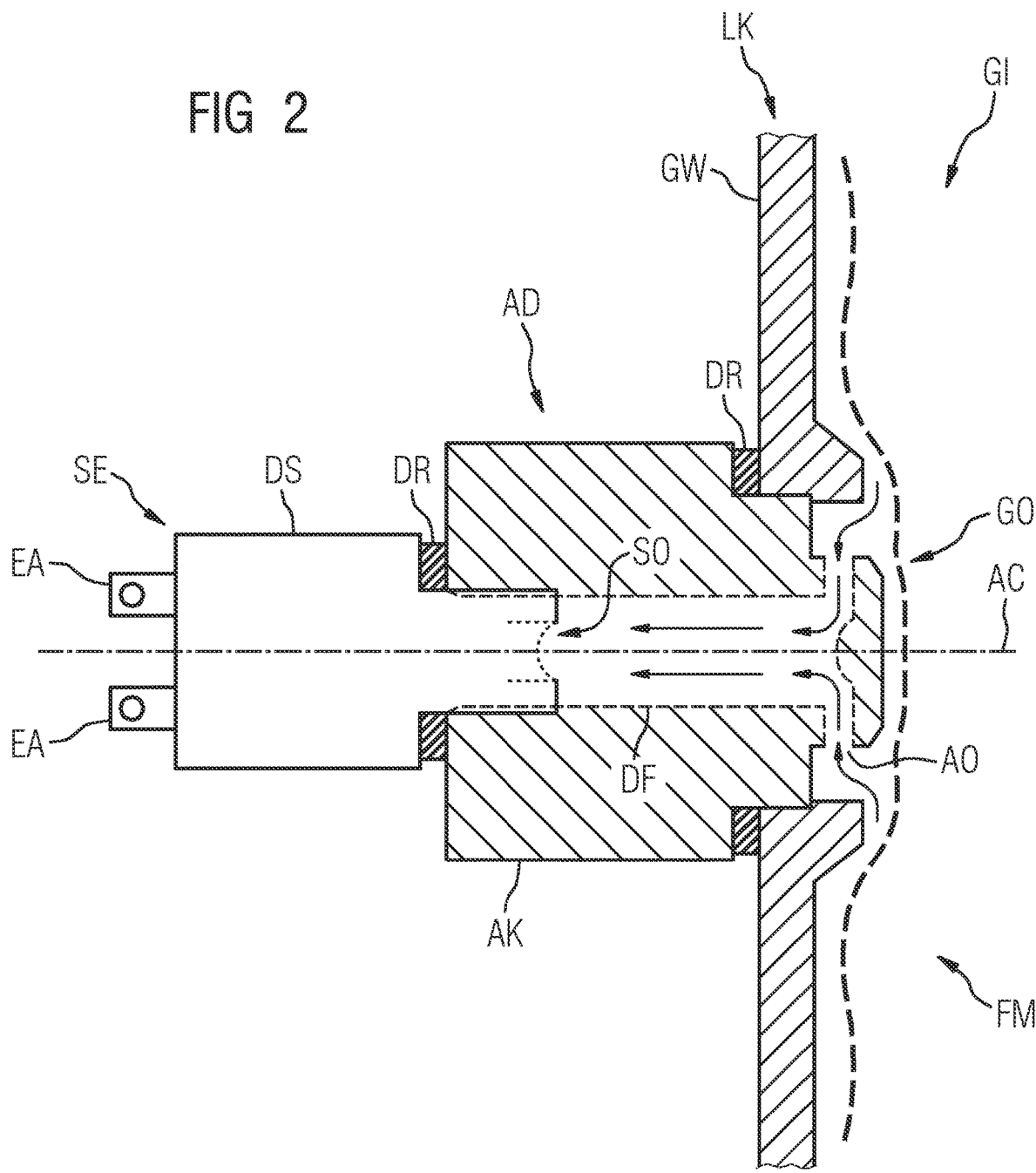

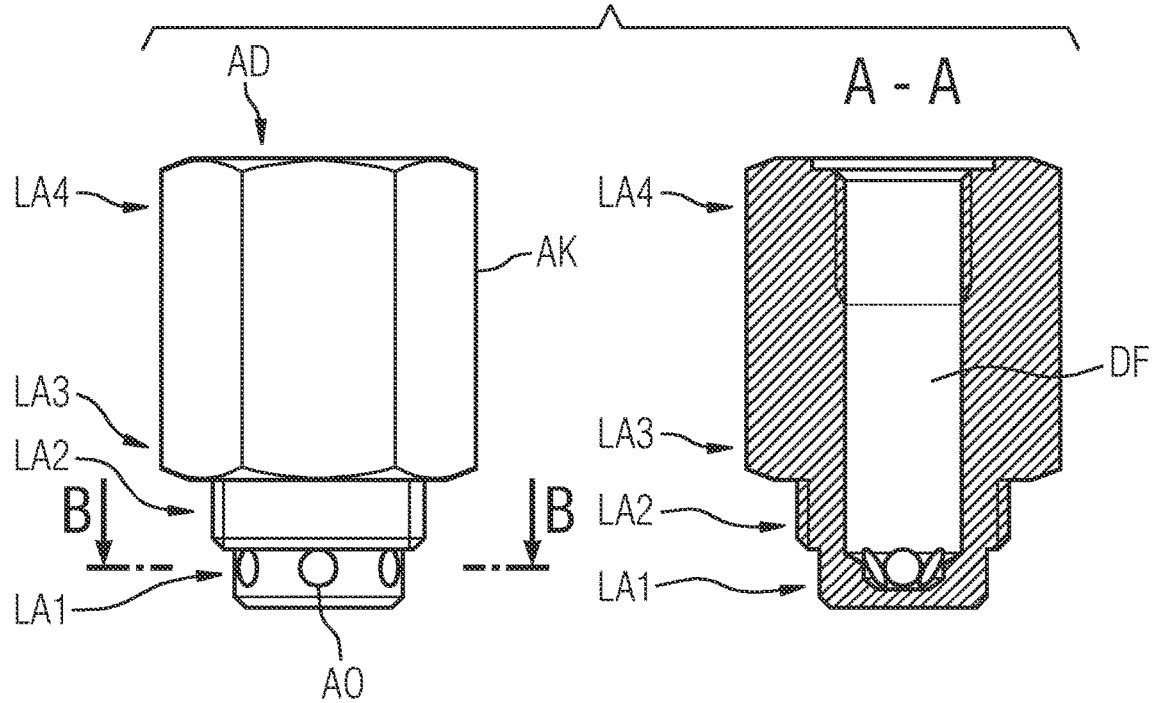
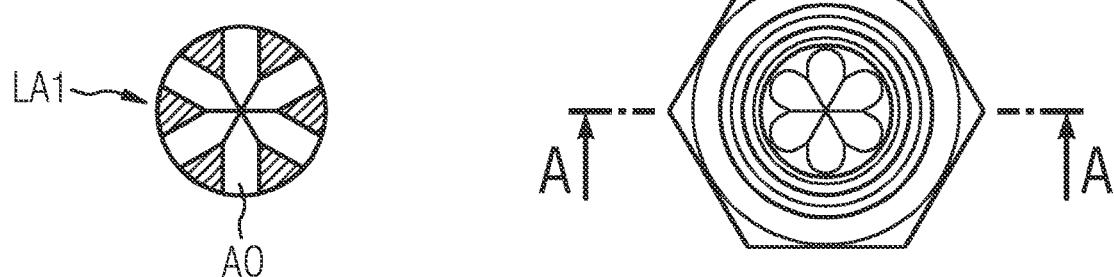

APPARATUS FOR MONITORING A POWER CAPACITOR AND ADAPTER FOR SUCH AN APPARATUS

CROSS-REFERENCE TO RELATED APPLICATION

This application claims the priority, under 35 U.S.C. § 119, of German Patent Application DE 10 2021 209 893.2, filed Sep. 8, 2021; the prior application is herewith incorporated by reference in its entirety.

FIELD AND BACKGROUND OF THE INVENTION

The invention relates to an apparatus for monitoring a power capacitor, wherein the adapter is used to connect a sensor device to a housing of the power capacitor, in order to ensure a reliable detection of a gas pressure in the housing interior of the power capacitor by way of the sensor device. The invention likewise relates to an adapter suitably embodied for such an apparatus.

In drive trains of electrically driven rail vehicles, and specifically in converters of such drive trains, power capacitors are used which assume the function of a DC link capacitor, for example. Typically, DC voltages greater than 1 kV are applied to DC link capacitors of an intermediate DC circuit.

Power capacitors of that kind are usually embodied as film capacitors with a dielectric made of a plastic material such as polypropylene or polyester, for example. In addition to the fault scenario of a short circuit, which can be identified by a suitable monitoring of the circuit, the occurrence of a fault scenario of the power capacitor is also possible due to an aging process of the metallization of the dielectric. In that context, a corrosion of the metallization, which is made of aluminum or zinc for example, over the operating life of the power capacitor leads to increasing current-related thermal losses, which restricts the self-healing capability of fault points of the metallization. That loss of the self-healing capability may lead to a melting of the dielectric and to pyrolysis, during which gaseous hydrocarbons are formed, which may form an explosive atmosphere on contact with oxygen in the external air. A power capacitor should therefore additionally be monitored with regard to the fault scenario of an excessive formation of pyrolysis gases in the housing, in order to be able to prevent, by suitable measures, the release thereof as a result of a bursting of the housing due to increased gas pressure, for example.

In order to provide monitoring with regard to that fault scenario, the power capacitors or the housing thereof may be embodied in a specific manner, for example, and a monitoring apparatus may be adapted accordingly, as is described for example in the older International Patent Publication WO 2017/028992 A1. In that context, a targeted change in volume of the gas-tight housing of the power capacitor, due to an increased gas pressure in the housing interior, is used to detect such a fault scenario.

In drive trains of older rail vehicles, or rail vehicles which have already been in operation for many years, such a monitoring of the power capacitors has not yet taken place to date. They are also not specifically prepared for such a monitoring. With a typical operating life of a rail vehicle of up to thirty years, however, for the safe operation thereof it is likewise of interest to be able to monitor the state of the power capacitors that are already installed. Replacing the power capacitors with those that are specifically prepared for monitoring, however, should be avoided in this context as this would result in high costs as well as the replacement of fully operational components of the drive train.

SUMMARY OF THE INVENTION

It is accordingly an object of the invention to provide an apparatus for monitoring a power capacitor and an adapter for such an apparatus, which overcome the hereinafore-mentioned disadvantages of the heretofore-known apparatuses and adapters of this general type and which enable a reliable monitoring of power capacitors which have not specifically been prepared for this purpose.

This object is achieved by the apparatus as well as by the adapter in accordance with the independent claims. Developments are disclosed in the respective dependent claims.

With the foregoing and other objects in view there is provided, in accordance with the invention, an apparatus for monitoring a power capacitor, wherein the power capacitor has a housing, the housing interior of which can be closed off in a gas-tight manner at at least one housing opening, comprising at least one sensor device, which outputs a signal as a function of a gas pressure in the housing, and an adapter, which mechanically connects the sensor device to the housing at the housing opening and fluidically connects it to the housing interior, wherein the adapter has a cylindrical adapter body divided into a plurality of functional longitudinal sections and a feed-through for the fluidic connection extending over the plurality of longitudinal sections, wherein a first longitudinal section of the adapter body, which is disposed in the region of the housing opening after the connection of the adapter to the housing, caps off or closes off the feed-through in a plane perpendicular to a longitudinal axis of the adapter body and fluidically connects it to the housing interior in at least one plane parallel with the longitudinal axis.

Power capacitors, as have already been used in current converters of railway vehicles for many years, typically have a cylindrical housing with a circular or prismatic cross-section. The housing is manufactured from aluminum or stainless steel sheets welded in a gas-tight manner, meaning that it has a cup-shaped basic shape. Disposed in the housing are one or more windings of metallized film, which are electrically connected to electrical terminals disposed at the base of the housing by stranded copper conductors or copper strips. In turn, the housing is closed off in a gas-tight manner by welding by using a housing cover made of the same material as the housing, for example. Usually, the housing cover or another housing wall has a smaller housing opening that can be closed off, which is used during the production of the power capacitor for the introduction of filler material into the housing interior. A hardening casting compound, which is used both for mechanical stabilization as well as for electrical insulation of the film winding(s) in relation to the metallic housing, is used as filler material, for example. The housing opening usually has an internal thread, into which a corresponding closure cover is screwed, in order to close off the housing in a gas-tight manner in turn.

In principle, such a housing opening is suitable for installing, instead of the closure cover, a sensor device with which the gas pressure in the housing interior of the power capacitor is monitored. A known pressure switch for industrial applications, for example, is suitable as a sensor device. This usually has a cylindrical body with an opening at a longitudinal end of the body, by which pressure of a fluid, for example a gas, is applied to a sensor, for example a membrane.

When installing such a pressure switch as sensor device on the housing opening, however, it is disadvantageously not possible to ensure that the opening thereof is not at least partially closed off by casting compound located in the region of the housing opening, which means that, due to a lack of fluidic connection between the sensor and the atmosphere of the housing interior, it is not possible for the sensor to detect a change in the gas pressure in the housing. Mechanically removing casting compound in this region, which could rectify this problem, should be avoided, however, in order to ensure the operational safety of the power capacitor.

According to the invention, there is therefore provision in the apparatus for an adapter, which is able to establish both a mechanical connection between the sensor device and a housing opening of the housing as well as a reliable fluidic connection between the sensor device and the housing interior. A feed-through, which extends over the adapter body that is divided into a plurality of longitudinal sections, is used for the fluidic connection in this context. In order to prevent the feed-through from being closed off by casting compound when installing the adapter on the housing opening, as described above, the feed-through is capped off in a first longitudinal section of the adapter body, which is used for the fluidic connection with the housing interior, in a plane running perpendicularly to the longitudinal axis of the adapter body.

For this purpose, the adapter body may be implemented in such a manner, for example, that the plurality of longitudinal sections are disposed along a central longitudinal axis of the cylindrical adapter body and that the feed-through runs centrally and with a certain uniform diameter along the longitudinal axis in the adapter body. At a first end of the adapter body, at which it is mechanically connected to the housing of the capacitor, the feed-through is capped off by a part of the adapter body which is disposed in a plane perpendicular to the longitudinal axis. When installing the adapter on the housing opening or arranging the first longitudinal section of the adapter body in the region of the housing opening, this advantageously avoids the feed-through coming into direct contact with the filler material or the casting compound and possibly being closed off thereby.

The fluidic connection between the feed-through and the atmosphere of the housing interior, by contrast, is established for example by one or more adapter openings, which are disposed in one or more planes parallel with the longitudinal axis of the adapter body and at a distance from the part of the adapter body which caps off or closes in the perpendicular plane. If and to the extent that the first longitudinal section has a circular cross-section, a plurality of adapter openings are preferably disposed distributed over the circumference of the longitudinal section and for example are formed as bore holes with a uniform diameter. In the same way, the adapter openings may be disposed in a distributed manner, if the cross-section of the first longitudinal section has a first prismatic cross-section with a plurality of flat side surfaces, wherein an adapter opening is disposed on each side surface, for example. As an alternative to bore holes with a uniform diameter, adapter openings may also, for example, each have a rectangular cross-section which tapers toward the feed-through. A longitudinal axis of the adapter openings is preferably oriented perpendicularly to the longitudinal axis of the feed-through, but alternatively may also be at a certain angle thereto and be oriented in the direction of the housing interior, starting from the feed-through, for example.

According to one embodiment of the apparatus, a second longitudinal section of the adapter body, which follows the first longitudinal section and is used for the mechanical connection to the housing, has an external thread which is compatible with an internal thread of the housing opening.

The second longitudinal section, which may also be referred to as external thread section, is thus disposed below the first longitudinal axis when viewed in the direction of the longitudinal axis of the cylindrical adapter body. The diameter of the second longitudinal section, as well as the external thread thereof, are embodied in such a manner that they are compatible with the diameter of the housing opening of the housing of the power capacitor or with the internal thread thereof, and thus enable a permanent screw connection or mechanical connection between the adapter and the housing. For example, the housing opening of the known power capacitor described above has a ½" internal thread, meaning that the second longitudinal section correspondingly has a ½" external thread. A length of the external thread in the direction of the longitudinal axis substantially corresponds to the corresponding length of the internal thread of the housing opening, for example. In particular, the external thread of the second longitudinal section may also have a shorter length, however, if this is already sufficient for a secure mechanical connection between the adapter and the housing of the power capacitor.

According to a further embodiment of the apparatus based on the above embodiment, the first longitudinal section has an external diameter which is less than the external diameter of the second longitudinal section.

Particularly if, as described above, the length of the external thread of the second length section is less than the length of the internal thread of the housing opening, then after installing the adapter on the housing opening the adapter openings of the first longitudinal section are disposed partially or preferably entirely within the housing opening or in the region of the internal thread of the housing opening. Advantageously, this arrangement additionally makes it possible to ensure that the adapter openings are disposed in a region of the housing of the power capacitor which is free from filler material or casting compound. Preferably, the shared length of the first and second longitudinal section largely corresponds to the length of the internal thread of the housing opening or the shared length is not greater than the corresponding length of the closure cover which was previously disposed in the housing opening.

According to a further embodiment of the apparatus based on one of the two preceding embodiments, a third longitudinal section of the adapter body, which follows the second longitudinal section, is used for fastening the adapter to the housing.

The third longitudinal section, which may also be referred to as tool section, is disposed below the first longitudinal axis when viewed in the direction of the longitudinal axis of the cylindrical adapter body. For example, this section has a prismatic, in particular hexagonal, cross-section, on which it is possible for an installation specialist to use a suitable wrench for screwing the adapter into the housing opening.

According to a further embodiment of the apparatus based on the above embodiment, the third longitudinal section has an external diameter which is greater than an external diameter of the second longitudinal section.

Due to this external diameter being greater, at least in the region of the second longitudinal section, a circumferential shoulder is advantageously created in the radial direction, on which a sealing ring can be disposed. Such a sealing ring made of an elastic material, for example a plastic, is preferably used to seal off the housing from the adapter body and thus ensure that the housing is gas-tight. When installing the adapter by screwing the external thread of the second longitudinal section to the internal thread of the housing opening, the shoulder exerts a mechanical force on the sealing ring in a planar manner in the direction of the longitudinal axis, whereby the sealing ring is pressed between the shoulder and the outer edge of the housing opening. For example, a circumferential groove may additionally be provided in the shoulder, in order to ensure a certain length of the sealing ring during installation.

According to a further embodiment of the apparatus based on one of the two preceding embodiments, a fourth longitudinal section, which follows the third longitudinal section and is used for the mechanical connection between the sensor device and the adapter body, has an interface which is compatible with an interface of the sensor device.

The interfaces of the sensor device and the fourth longitudinal section are in turn, for example, embodied as an external thread or as an internal thread. In this context, the internal thread of the fourth longitudinal section is preferably embodied as part of the feed-through of the adapter body or is cut into it, meaning that the sensor device provided with an external thread or the opening thereof, by which pressure is applied to the sensor or a membrane, protrudes directly into the feed-through. Accordingly, the fourth longitudinal section of the adapter body may also be referred to as internal thread section.

In the case of a typical ¼" external thread of the sensor device and, for example, a ½" internal thread of the housing opening of the housing of the power capacitor, as described above, the adapter according to the invention is thus also able to fulfill the function of a size adapter.

The shape of the cross-section of the fourth longitudinal section, up to the internal thread, preferably corresponds to that of the third longitudinal section or the fourth longitudinal section is also embodied as a part of the third longitudinal section. Advantageously, this means that the total length of the adapter can be reduced, which makes it possible to install the apparatus even where space is limited. This is particularly significant, since in current converters of existing vehicles there is usually no space specifically provided for the arrangement of an apparatus for monitoring the power capacitors.

According to a further embodiment of the apparatus, the sensor device includes at least one pressure switch, which is mechanically connected to the adapter and which, in the event of a gas pressure exceeding a predefined threshold value, closes or interrupts an electrical connection.

As already explained above, a pressure switch has a spring-loaded membrane, in particular made of stainless steel, for example. When a settable trigger pressure is reached, the pressure switch switches or closes or opens an electrical connection, which lies at two electrical terminals of the pressure switch.

According to a further embodiment of the apparatus, which is an alternative to the preceding embodiment, the sensor device includes at least one pressure sensor, which is mechanically connected to the adapter and which, in the event of a gas pressure exceeding a predefined threshold value, generates an electrical signal.

Sensor devices according to the two preceding embodiments are particularly suitable for monitoring the gas pressure in the housing interior of a power capacitor. An evaluation of signals of the sensor devices or changes in a current flow triggered thereby can be detected and evaluated by a central evaluation device, for example, wherein the evaluation device is preferably embodied to monitor all power capacitors of a current converter that are equipped with an apparatus according to the invention.

With the objects of the invention in view, there is also provided an adapter for an apparatus for monitoring a power capacitor, wherein the power capacitor has a housing, the housing interior of which can be closed off in a gas-tight manner at at least one housing opening, wherein the adapter is embodied to mechanically connect a sensor device to the housing at the housing opening and fluidically connect it to the housing interior, the adapter has a cylindrical adapter body divided into a plurality of functional longitudinal sections and a feed-through for the fluidic connection extending over the plurality of longitudinal sections, and wherein a first longitudinal section of the adapter body, which is disposed in the region of the housing opening after the connection of the adapter to the housing, caps off or closes off the feed-through in a plane perpendicular to a longitudinal axis of the adapter body and fluidically connects it to the housing interior in at least one plane parallel with the longitudinal axis.

According to one embodiment of the adapter, a second longitudinal section of the adapter body, which follows the first longitudinal section and is used for the mechanical connection to the housing, has an external thread which is compatible with an internal thread of the housing opening. In this context, the first longitudinal section preferably has an external diameter which is less than the external diameter of the second longitudinal section.

In this context, the external thread of the second longitudinal section may be identical to the internal thread of the fourth longitudinal section, or may differ therefrom. Thus, for example, both the second longitudinal section and the fourth longitudinal section have a ¼" or a ½" external thread or internal thread. Alternatively, the second longitudinal section has a ½" external thread for example, whereas the fourth longitudinal section has a ¼" internal thread, as already mentioned above. Advantageously, the adapter body can be adapted to the predefined dimensions or diameter of the housing opening, as well as of the sensor device, in a simple manner.

According to a further embodiment of the adapter based on the preceding embodiment, a third longitudinal section of the adapter body, which follows the second longitudinal section, is used for fastening the adapter to the housing. In this context, the third longitudinal section preferably has an external diameter which is greater than an external diameter of the second longitudinal section.

According to a further embodiment of the adapter based on the preceding embodiment, a fourth longitudinal section, which follows the third longitudinal section and is used for the mechanical connection between the adapter body and the sensor device, has a mechanical interface which is compatible with an interface of the sensor device.

According to a further embodiment of the adapter, it is manufactured from a metal, in particular from stainless steel or brass.

Advantageously, the adapter or the specific shaping thereof in the respective longitudinal sections can be produced by way of machining of a metallic cylindrical or prismatic basic body. This means that the adapter can be produced in a cost-effective manner and in particular, due to the fact that it can be produced from a single body of metal, has a high level of durability and gas-tightness.

Other features which are considered as characteristic for the invention are set forth in the appended claims.

Although the invention is illustrated and described herein as embodied in an apparatus for monitoring a power capacitor and an adapter for such an apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 is a diagrammatic, longitudinal-sectional view of a multiple-unit train as an exemplary rail vehicle;

FIG. 2 is a fragmentary, longitudinal-sectional view of an adapter connected to a housing of a power capacitor and to a sensor device; and FIG. 3 includes elevational, longitudinal-sectional and plan views of a specific embodiment of the adapter according to the invention.

DETAILED DESCRIPTION OF THE INVENTION

Referring now to the figures of the drawings in detail and first, particularly, to FIG. 1 thereof, there is seen a diagrammatic view of a rail vehicle, which by way of example is embodied as a multiple-unit train TZ for passenger transportation. The multiple-unit train TZ includes a plurality of cars, wherein a number of middle cars MW, of which only one is shown in a simplified manner in FIG. 1, are disposed between a first end car EW1 and a second end car EW2. The cars are disposed one behind the other in the direction of travel FR, mechanically interconnected by using suitable car couplings. Each of the cars possesses a vehicle body WK, wherein preferably all vehicle bodies WK provide a passenger compartment for accommodating passengers. Intercar gangways are provided between the cars, by which passengers are able to move between adjacent cars or over the entire length of the multiple-unit train.

The vehicle bodies WK are in each case supported on rails of a track by bogies. Two bogies are disposed on each vehicle body by way of example in each case, wherein adjacent vehicle bodies WK are supported on so-called Jacobs bogies, by way of example. The bogies are embodied as motor bogies TDG with at least one driven wheel set or as trailer bogies LDG with exclusively non-driven wheel sets. According to the commonly accepted identification of driven wheel sets by filling in the wheels, which are represented on a schematic basis, in each case a motor bogie TDG, with two driven wheel sets in each case, as well as one respective trailer bogie LDG are disposed on the end cars EW of the multiple-unit train TZ. The middle cars MW are thus exclusively supported on trailer bogies.

As an alternative to the multiple-unit train TZ shown with a plurality of middle cars MW, it may include only the two end cars EW, on which motor bogies TDG and one or more trailer bogies LDG are disposed, according to FIG. 1. Likewise, the rail vehicle may also be embodied as a locomotive, the vehicle body of which is exclusively supported on trailer bogies.

In the end cars EW of the multiple-unit train TZ, components of the electrical drive system or of a drive train are indicated schematically. These components are usually disposed in specific regions within the vehicle body WK, in the underfloor region, in the roof region or even distributed over multiple cars. Further components of the drive system, such as one or more traction batteries or auxiliaries required for the operation of the components as well as for passenger comfort, for example, are not shown in FIG. 1.

Through the use of a pantograph PAN disposed in the roof region of the first end car EW1, the exemplary drive train of the multiple-unit train TZ can be electrically connected to an overhead line (not shown) of a railway supply network, wherein the overhead line carries a single-phase alternating current with a voltage of 15 kV at 16.7 Hz or 25 kV at 50 Hz. This alternating current is supplied to a network-side primary winding of a transformer TF, which steps down the network-side voltage level to a lower voltage level. A secondary winding of the transformer TF is connected to a network-side current converter, for example a rectifier GR or four-quadrant converter, which converts the applied AC voltage into a DC voltage and feeds an intermediate DC circuit ZK. According to the example in FIG. 1, the intermediate DC circuit ZK is used to feed two motor-side current converters, for example pulse inverters WR1, WR2, which convert the DC voltage of the intermediate DC circuit ZK into a three-phase AC voltage with variable frequency and amplitude in each case, which is fed to the stator windings of the respective drive motors in the motor bogies TDG1 and TDG2. The function of the current converters GR, WR1, WR2 in particular is controlled, for example, by a central control device ST of the drive system.

The drive system of the multiple-unit train TZ, as an alternative or in addition, may also be electrically connected to an overhead line or a conductor rail, which carries a direct current with a voltage level of 3 kV or 1.5 kV, for example, by a corresponding pantograph. In this case, the intermediate DC circuit ZK can be fed, for example, directly or by a DC-DC converter which converts the voltage level of the railway supply network to a desired voltage level of the intermediate DC circuit. Furthermore, the drive system of the multiple-unit train TZ, as an alternative or in addition, may also be supplied with electrical energy by using one or more traction batteries and/or fuel cell systems, wherein the intermediate DC circuit for example is in turn fed by a DC-DC converter.

In the intermediate DC circuit ZK, a number or a plurality of power capacitors connected in parallel are used to store electrical energy, which is supplied to the motor-side current converter. In this context, the power capacitors may be disposed in a housing of the network-side or of the motor-side current converter or also in a separate housing, in the form of a so-called capacitor bank.

FIG. 2 diagrammatically shows a sectional view of an adapter AD according to the invention, which is disposed at a housing opening GO of the housing of a power capacitor LK on one side, and on which a sensor device SE in the form of a pressure switch DS is disposed on the other side. In this context, only one housing wall GW of the housing of the power capacitor LK is shown, in which housing wall GW the housing opening GO is disposed. This housing wall GW is, for example, a housing cover of a cup-shaped housing of the power capacitor LK. The housing is produced from welded stainless steel or aluminum sheet metal, for example.

Disposed in the housing interior GI are one or more capacitor windings, which are electrically connected to terminals on the housing, wherein the two mentioned constituent parts of the power capacitor LK are not specifically shown. Disposed in the region of the housing wall GW, in the housing interior GI, is filler material FM in the form of a casting compound, as is shown by way of example on the basis of the thick dashed line. The filler material FM has been filled into the housing interior GI through the housing opening GO during the production of the power capacitor LK and, once it has cured, is usually at a certain distance, which however is not uniform or varies, from the housing wall GW. Particularly in the space which is formed as a result, as described in the introduction, a gaseous atmosphere of pyrolysis gases forms over the operating life of the power capacitor LK.

The material of the housing wall GW has a greater thickness in the region of or around the housing opening GO, for example. On one hand, this is used for greater stability of the housing wall GW in this region; on the other hand it is used for the cutting-in of an internal thread, in order to be able to cap off the housing opening GO in a gas-tight manner by using a closure cover once the housing has been filled with filler material FM. The greater thickness may be achieved by welding in a metallic ring with an internal thread that has already been premanufactured, or by deep drawing the housing wall material at this point, for example. In the representation in FIG. 2, such a closure cover has been removed and replaced by an adapter AD according to the invention.

The adapter AD is formed of a cylindrical adapter body AK, which for example is likewise produced from stainless steel. This adapter body AK has a plurality of longitudinal sections, as are discussed below and shown in further detail in FIG. 3, along a longitudinal axis AC. A first longitudinal section has a circular cross-section, with a plurality of adapter openings AO being distributed over the circumference thereof. These adapter openings AO connect the gas atmosphere in the housing interior GI to a central feed-through DF in the adapter body AK, as shown by flow arrows by way of example. The adapter openings AO and the central feed-through DF are shown by dashed lines.

A fluidic connection between the feed-through DF of the adapter AD and the gas atmosphere in the housing interior GI is ensured in that, on one hand, the adapter openings AO are disposed in the region of the internal thread of the housing opening GO, wherein, due to a lesser external diameter of the first longitudinal section compared to the internal diameter of the housing opening GO, a certain spacing is implemented. On the other hand, the feed-through DF of the adapter AD is capped off in the region of the housing opening GO in a plane perpendicular to the longitudinal axis AC or parallel with the housing wall GW. This capping off by using a part of the adapter body AK ensures that, when the adapter AD is disposed at the housing opening GO, no filler material FM is able to penetrate into the feed-through DF and block it as a result.

A second longitudinal section disposed below the first longitudinal section in the longitudinal direction has an external diameter compatible with the housing opening GO as well as an external thread compatible with the internal thread thereof, in order to mechanically fasten the adapter AD to the housing of the power capacitor LK. In order to additionally prevent a possible escape of pyrolysis gases to the surrounding area, a sealing ring DR made of a suitable material is disposed between a third longitudinal section and the housing wall GW. The third longitudinal section is disposed below the second longitudinal section and preferably has a greater external diameter than the second longitudinal section. The greater external diameter results in a circumferential shoulder, through the use of which, when the adapter AD is fastened to the housing opening GW, a force can be exerted onto the sealing ring DR in the longitudinal direction and the sealing ring can be pressed. The cross-section of the third longitudinal section is preferably not circular like at least the second longitudinal section, but rather prismatic or hexagonal, for example. This cross-sectional shape makes it possible to be able to use an appropriately sized wrench to screw the adapter AD into the housing opening GO.

A fourth longitudinal section, which is disposed below the third longitudinal section or is embodied as part of the third longitudinal section, has an internal thread which is cut into the feed-through DF. The internal thread is preferably only cut into a part of the length of the feed-through DF, or only in the lower part thereof, wherein the length of the part is sufficient to fasten the sensor device SE or the pressure switch DS to the adapter AD.

The pressure switch DS has a housing, in which a membrane or a pressure sensor is disposed. The membrane or the pressure sensor is fluidically connected to the feed-through DF through a sensor opening SO, whereby the gas pressure prevailing in the housing interior GI is applied thereto. Corresponding to the adapter body AK, the housing has a shoulder, through the use of which, when the sensor device SE is fastened to the adapter AD, in turn a force can be exerted onto the sealing DR in the longitudinal direction and the sealing ring can be pressed, in order to prevent a possible escape of gas at this interface between adapter body AK and pressure switch DS. The pressure switch DS has two electrical terminals EA, at which electrical lines of the monitoring apparatus are connected. Preferably, it is possible to set a threshold value of the gas pressure, at which the pressure switch DS switches. Depending upon the embodiment of the pressure switch DS, a set threshold value being reached or exceeded due to an increased gas pressure in the housing of the power capacitor LK leads, for example, to a circuit being closed. The closing of the circuit and thus the flowing of a current is detected in an evaluation device and, on the basis thereof, a warning signal is output, for example, which indicates an increased gas pressure in the power capacitor LK. Such an evaluation device, which is not specifically shown, may be implemented for example as part of a central control device of the rail vehicle or as a separate unit.

FIG. 3 diagrammatically shows various views of an exemplary adapter AD according to the invention. In this context, the top left representation shows a top view of the adapter AD, i.e. an outer view of the adapter body AK. From this view as well as the bottom right representation, it can be seen for example that the third and fourth longitudinal sections LA3, LA4 of the adapter body AK have a prismatic or hexagonal cross-section. Furthermore, it can be seen from the top left and the top right representations that the third longitudinal section LA3 embodies a circumferential shoulder in relation to the second longitudinal section LA2 or below the external thread thereof. The bottom left representation shows a section along the section line B-B in the top left representation. From this view, it can be seen in particular that six adapter openings AO are disposed in a circumferential manner in the first longitudinal section LA1 of the adapter body AK, wherein the adapter openings AO each have the shape of a circular hole, which for example can be produced by forming a bore hole in the adapter body AK. The top right representation shows a section along the section line A-A in the bottom right representation. From this view, it is possible to see in particular the internal thread in the fourth longitudinal section LA4, which is used for the mechanical connection to the sensor device SE or the pressure switch DS, as well as the capping off of the central feed-through in the lower region of the first longitudinal section LA1. Finally, the bottom right representation shows a further top view, from which the cross-section of the fourth longitudinal section LA4 can be seen. Unlike in the representation in FIG. 2, the fourth longitudinal section LA4 has an additional groove around the feed-through DF or around the internal thread, which is used for the arrangement of a seal.

The following is a summary list of reference numerals and the corresponding structure used in the above description of the invention.

REFERENCE CHARACTERS

A-A Sectional plane
AC Longitudinal axis
AD Adapter
AK Adapter body
AO Adapter opening
B-B Sectional plane
EW End car
DF Feed-through
DR Sealing ring
DS Pressure switch
EA Electrical terminals
FM Filler material
FR Direction of travel
GI Housing interior
GO Housing opening
GR Rectifier
GW Housing wall
LA1-LA4 Longitudinal section
LK Power capacitor
MW Middle car
SO Sensor opening
PAN Pantograph
SE Sensor device
ST Control device
TDG Motor bogie
TF Transformer
TZ Multiple-unit train
WK Vehicle body
WR Inverter
ZK Intermediate DC circuit

The invention claimed is:

1. An apparatus for monitoring a power capacitor having a housing with a housing interior configured to be closed off in a gas-tight manner at at least one housing opening, the apparatus comprising:
at least one sensor device outputting a signal as a function of a gas pressure in the housing;
an adapter mechanically connecting said sensor device to the housing at the at least one housing opening and fluidically connecting said sensor device to the housing interior;
said adapter having a cylindrical adapter body divided into a plurality of functional longitudinal sections and a feed-through for the fluidic connection extending over said plurality of longitudinal sections, said adapter body having a longitudinal axis;
said plurality of longitudinal sections including a first longitudinal section to be disposed in a region of the at least one housing opening after connecting said adapter to the housing, said first longitudinal section closing off said feed-through in a plane perpendicular to said longitudinal axis and fluidically connecting said feed-through to the housing interior in at least one plane parallel to said longitudinal axis.

2. The apparatus according to claim 1, wherein said plurality of longitudinal sections includes a second longitudinal section following said first longitudinal section, said second longitudinal section providing said mechanical connection to the housing and having an external thread compatible with an internal thread of the at least one housing opening.

3. The apparatus according to claim 2, wherein said first longitudinal section has an external diameter being less than an external diameter of said second longitudinal section.

4. The apparatus according to claim 2, wherein said plurality of longitudinal sections includes a third longitudinal section following said second longitudinal section, said third longitudinal section fastening said adapter to the housing.

5. The apparatus according to claim 4, wherein said third longitudinal section has an external diameter being greater than an external diameter of said second longitudinal section.

6. The apparatus according to claim 4, wherein said plurality of longitudinal sections includes a fourth longitudinal section following said third longitudinal section, said fourth longitudinal section providing a mechanical connection between said sensor device and said adapter body and said fourth longitudinal section having a mechanical interface compatible with an interface of said sensor device.

7. The apparatus according to claim 1, wherein said sensor device includes at least one pressure switch mechanically connected to said adapter, said at least one pressure switch closing or interrupting an electrical connection upon a gas pressure exceeding a predefined threshold value.

8. The apparatus according to claim 1, wherein said sensor device includes at least one pressure sensor mechanically connected to said adapter, said at least one pressure sensor generating an electrical signal upon a gas pressure exceeding a predefined threshold value.

9. An adapter for an apparatus for monitoring a power capacitor having a housing with a housing interior configured to be closed off in a gas-tight manner at at least one housing opening, the adapter comprising:
a mechanical connection of a sensor device to the housing at the at least one housing opening and a fluidic connection of the sensor device to the housing interior;
a cylindrical adapter body divided into a plurality of functional longitudinal sections, said adapter body having a longitudinal axis;
a feed-through for the fluidic connection extending over said plurality of longitudinal sections;
said plurality of functional longitudinal sections including a first longitudinal section to be disposed in a region of the at least one housing opening after connecting the adapter to the housing, said first longitudinal section closing off said feed-through in a plane perpendicular to said longitudinal axis and said first longitudinal section fluidically connecting said feed-through to the housing interior in at least one plane parallel to the longitudinal axis.

10. The adapter according to claim 9, wherein said plurality of functional longitudinal sections includes a second longitudinal section following said first longitudinal section, said second longitudinal section providing said mechanical connection to the housing, and said second longitudinal section having an external thread compatible with an internal thread of the at least one housing opening.

11. The adapter according to claim 10, wherein said first longitudinal section has an external diameter being less than an external diameter of said second longitudinal section.

12. The adapter according to claim 10, wherein said plurality of functional longitudinal sections includes a third longitudinal section following said second longitudinal section, said third longitudinal section fastening the adapter to the housing.

13. The adapter according to claim 12, wherein said third longitudinal section has an external diameter being greater than an external diameter of said second longitudinal section.

14. The adapter according to claim 12, wherein said plurality of functional longitudinal sections includes a fourth longitudinal section following said third longitudinal section, said fourth longitudinal section mechanically connecting said adapter body to said sensor device, and said fourth longitudinal section having a mechanical interface compatible with an interface of said sensor device.

15. The adapter according to claim 9, wherein the adapter is formed of metal.

16. The adapter according to claim 15, wherein said metal is stainless steel or brass.

* * * * *